United States Patent
Moussaoui

(10) Patent No.: US 8,415,936 B2
(45) Date of Patent: Apr. 9, 2013

(54) MULTIPHASE DC-DC CONVERTER USING ZERO VOLTAGE SWITCHING

(75) Inventor: Zaki Moussaoui, San Carlos, CA (US)

(73) Assignee: Intersil Americas Inc., Milpitas, CA (US)

( * ) Notice: Subject to any disclaimer, the term of this patent is extended or adjusted under 35 U.S.C. 154(b) by 318 days.

(21) Appl. No.: 13/013,963

(22) Filed: Jan. 26, 2011

(65) Prior Publication Data

US 2012/0013313 A1    Jan. 19, 2012

Related U.S. Application Data

(60) Provisional application No. 61/365,523, filed on Jul. 19, 2010, provisional application No. 61/426,404, filed on Dec. 22, 2010.

(51) Int. Cl.
G05F 1/00    (2006.01)
(52) U.S. Cl.
USPC .......................................... 323/272; 323/224
(58) Field of Classification Search .................. 323/224, 323/283, 272
See application file for complete search history.

(56) References Cited

U.S. PATENT DOCUMENTS 6,191,566 B1 * 2/2001 Petricek et al. ............... 323/224

OTHER PUBLICATIONS

Sekiya, Hiroo et al. "Design of Generalized Class $E^2$ DC/DC Converter." Graduate School of Science and Technology, Chiba University, Chiba, Japan. 2002 IEEE. pp. 823-826.

* cited by examiner

*Primary Examiner* — Shawn Riley
(74) *Attorney, Agent, or Firm* — Gary Stanford

(57) ABSTRACT

A multiphase DC-DC converter including at least one conversion path, multiple switch capacitance networks, and a multiphase switch controller. Each conversion path includes first and second intermediate nodes. Each switch capacitance network includes a capacitance coupled in parallel with an electronic switch and is coupled to one of the intermediate nodes. The switch controller controls the switch capacitance networks using zero voltage switching. Multiple phases may be implemented as multiple conversion paths each having first and second intermediate nodes coupled to first and second switch capacitance networks, respectively. A single conversion path may be provided with multiple switch capacitance networks coupled to each intermediate node for multiple phases. Alternatively, a common front end with a first intermediate node is coupled to one or more switch capacitance networks followed by multiple back-end networks coupled in parallel for multiple phases. A regulator may be provided to regulate an output voltage.

20 Claims, 7 Drawing Sheets

MULTIPHASE DC-DC CONVERTER USING ZERO VOLTAGE SWITCHING

CROSS-REFERENCE TO RELATED APPLICATIONS

This application claims the benefit of U.S. Provisional Application Ser. No. 61/365,523, filed on Jul. 19, 2010, and Ser. No. 61/426,404, filed on Dec. 22, 2010, in which both are hereby incorporated by reference in their entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A multiphase DC-DC converter as described herein relates to power management including voltage regulator mode (VRM) servers and the like. A multiphase converter as described herein provides the ability to achieve high efficiency at high frequency, and may be used for implementations which have a high input voltage and which does not require isolation. A multiphase converter as described herein employs zero voltage switching (ZVS). A multiphase converter as described herein improves overall efficiency because of ZVS and can be used for non-isolated high input voltage and low output voltage converters. A multiphase converter as described herein may use all lower side switching. A multiphase converter as described herein solves the problem of high side drive for high frequency applications. A multiphase converter as described herein provides for multiphase configurations at N times the switching frequency. A single phase may operate at a relatively high frequency, such as, for example, 10 megahertz (MHz) in which multiple phases, such as, for example, N phases is designed for N X 10 MHz high frequency operation (e.g., 5 phase configuration operates at 50 MHz). The high frequency enables the use of parasitic inductance and capacitance. The converter topology may be used for envelope tracking.

Figure 1:
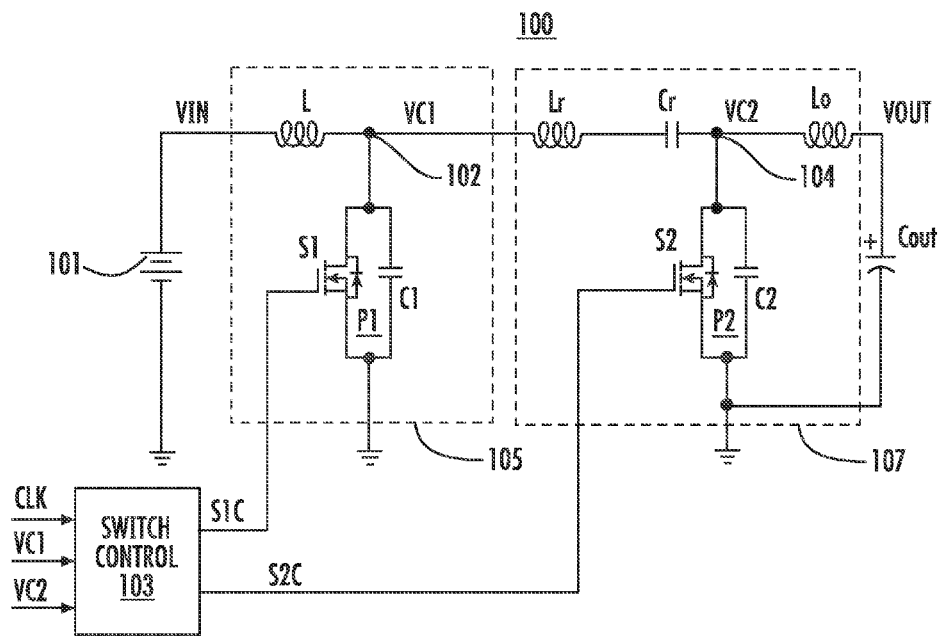
FIG. 1 is a block and schematic diagram of a single phase DC-DC converter according to one embodiment.

FIG. 1 is a block and schematic diagram of a single phase DC-DC converter 100 according to one embodiment. An input voltage source 101 develops a DC input voltage VIN relative to a reference node, shown as ground. The reference node is shown herein as ground at "zero" volts or any other voltage level as understood by those skilled in the art. The ZVS operation is relative to the reference voltage which is considered to be the "zero" switching point even if the reference voltage is not actually at zero Volts (V). VIN is provided to one end of an inductor L, having its other end coupled to a first intermediate node 102 developing a voltage VC1. An electronic switch S1 has its drain coupled to node 102 and its source coupled to ground. A capacitor C1 is coupled between node 102 and ground and thus in parallel with the drain and source of S1. The switch S1 and capacitor C1 are collectively referred to as a switch capacitance network P1. Node 102 is coupled to one end of another inductor Lr, having its other end coupled to one end of a capacitor Cr. The other end of the capacitor Cr is coupled to a second intermediate node 104 developing a voltage VC2, which is further coupled to the drain of another electronic switch S2, to one end of a capacitor C2, and to one end of another inductor Lo. The source of S2 and the other end of C2 are both coupled to ground. The switch S2 and capacitor C2 are coupled in parallel and are collectively referred to as a switch capacitance network P2. The other end of Lo is coupled to an output node developing a DC output voltage VOUT, which is coupled to one end of an output capacitor Cout. The other end of Cout is coupled to ground. A switch control module 103 receives a clock signal CLK, and further receives the voltages VC1 and VC2 of the intermediate nodes 102 and 104, and provides a first control signal S1C to the gate of S1 and provides a second control signal S2C to the gate of S2. S1 and S2 are shown as N-channel (N-type) devices, such as N-channel metal-oxide semiconductor, field-effect transistors (MOSFETs), although other types of electronic switches are contemplated.

The converter 100 includes a front-end network 105 which includes L and P1 and a back-end network 107 which includes Lr, Cr, Lo, and P2, where the front-end and back-end networks operate to convert VIN to VOUT which is developed across the output capacitor Cout. The path from VIN to VOUT of the single phase DC-DC converter 100 including inductances L, Lr and Lo, the capacitance Cr and the intermediate nodes 102 and 104 developing voltages VC1 and VC2 is referred to herein as a conversion path. The switch control module 103 provides the control signals S1C and S2C to control the switch capacitance networks P1 and P2 to control DC-DC voltage conversion from VIN to VOUT.

Figure 2:
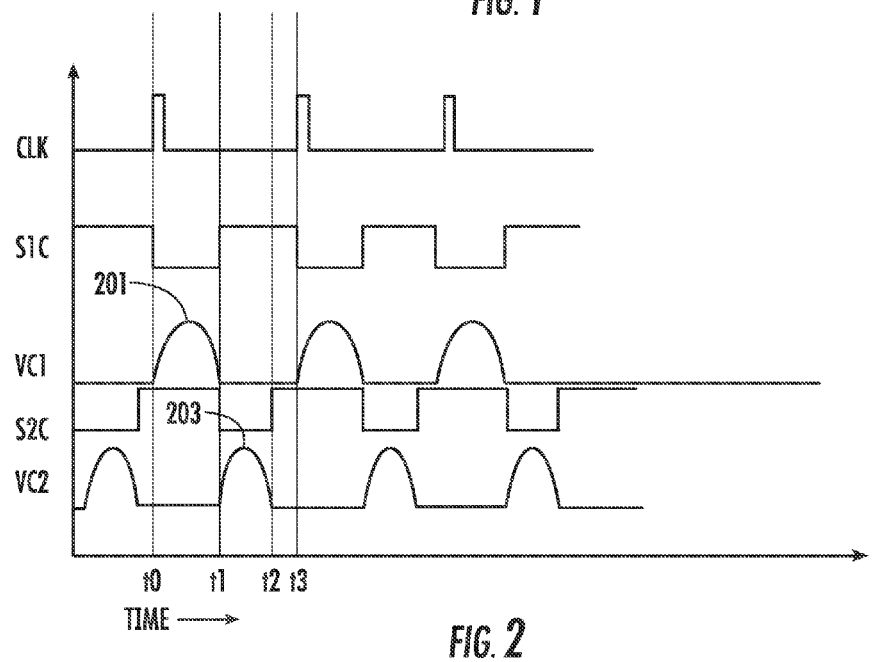
FIG. 2 is a timing diagram illustrating operation of the single phase DC-DC converter of FIG. 1 according to one embodiment.

FIG. 2 is a timing diagram illustrating operation of the single phase DC-DC converter 100 according to one embodiment. In FIG. 2, the CLK, S1C, VC1, S2C and VC2 signals are plotted versus time. The CLK signal provides pulses at a selected frequency of operation, such as 10 MHz. Just prior to a time t0, S1C and S2C are both high turning on both switches S1 and S2 so that VC1 and VC2 are both low. Each CLK pulse causes the switch control module 103 to pull SC1 low turning off S1. Thus, the next CLK pulse at time t0 pulls S1C low turning off S1 which initiates a positive-going sinusoidal pulse 201 of VC1. As soon as the sinusoidal pulse 201 returns back to zero at about time t1, SC1 is pulled back high turning S1 back on and SC2 is pulled low turning off S2. When S2 is turned off, a positive-going sinusoidal pulse 203 is initiated on VC2. As soon as the sinusoidal pulse of VC2 returns back to zero at about time t2, SC2 is pulled back high to turn S2 back on. S1 and S2 both stay on until the next CLK pulse at about time t3, which turns S1 off again and the cycle is repeated. Operation continues in this manner at the frequency established by CLK. As shown, a pair of front-end and back-end pulses occurs for each cycle of CLK.

The timing diagram of FIG. 2 illustrates the basic switching operation of the single phase DC-DC converter 100 according to zero voltage switching, which also generally applies to the multiphase configurations as further described herein. The switch (e.g., S1, S2) of each of the switch capacitance networks (e.g., P1, P2) is turned off to effectively insert the corresponding capacitor (e.g., C1, C2) into the circuit between the corresponding intermediate node (e.g., 102, 104) and ground. Each switch is turned on to effectively bypass the corresponding capacitor and thus ground the corresponding intermediate node (or otherwise couple the node to a reference voltage level). Various control schemes may be added to adjust operation to control the amount of energy transfer between input and output, such as for purposes of regulating at least one operating parameter. Regulated operating parameters may include, for example, the voltage level of the output voltage, the current level of the output current, the frequency level of operation, etc. One control method is variable frequency control. In certain embodiments, for example, the frequency of CLK may be variable according to a variable frequency control mechanism. Another control method is phase shift control. In certain embodiments, for example, the timing delay of the turn off of the switch S2 of the switch capacitance network P2 is adjusted for phase shift control. Another control method is pulse width modulation (PWM) control. In certain embodiments, for example, the timing delay of the turn off of the switch S1 of the switch capacitance network P1 is adjusted for PWM control.

Figure 3:
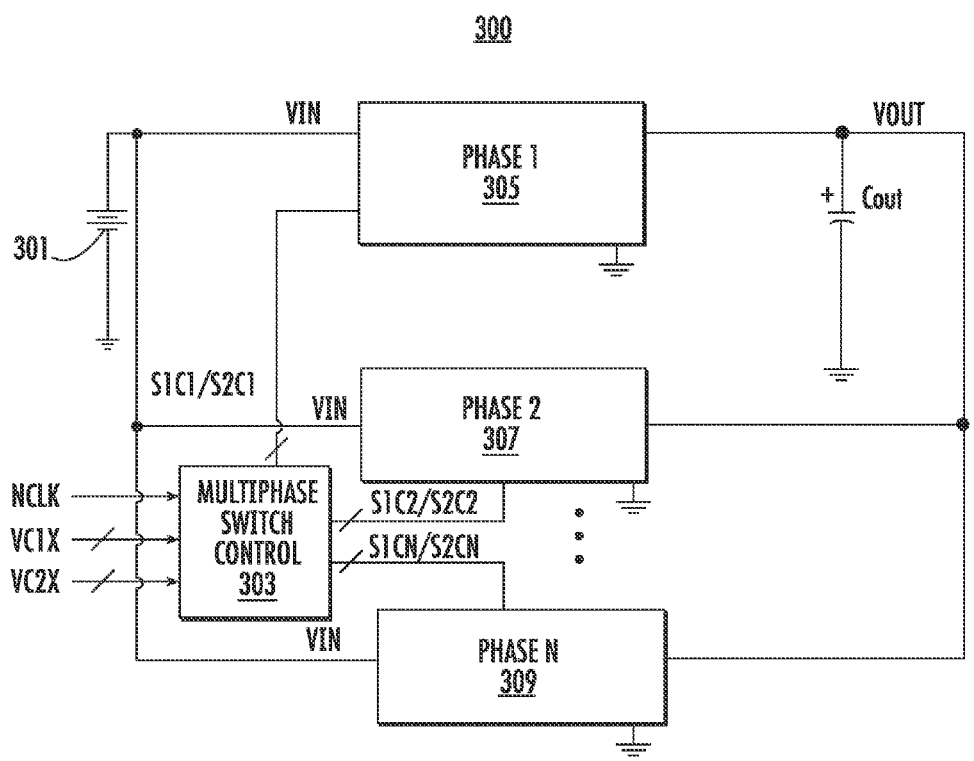
FIG. 3 is a block and schematic diagram of a multiphase DC-DC converter according to one embodiment including phase networks coupled in parallel.

FIG. 3 is a block and schematic diagram of a multiphase DC-DC converter 300 according to one embodiment. An input voltage source 301 develops a DC input voltage VIN relative to ground. In this case, VIN is provided to the input of a number "N" phase networks coupled in parallel, each configured in substantially the same manner as the single phase DC-DC converter 100, in which each phase network is coupled between VIN from voltage source 301 and a common output capacitor Cout developing the DC output voltage VOUT relative to ground. Thus, although not shown, each of the phase networks 1-N includes a corresponding one of N parallel conversion paths, each similar to that of the converter 100 including separate inductances, capacitances and corresponding intermediate nodes. Also, each phase network includes front-end and back-end switch capacitance networks similar to P1 and P2 of the converter 100.

As shown, VIN is provided to the input of a first phase network Phase 1 305, to the input of a second phase network Phase 2 307, and so on up to a last phase network Phase N 309. N is a positive integer greater than 1 such that any practicable number of phases (2 or more) is contemplated. Thus, although 3 phases are shown (1, 2, . . . , N), any number of phases may be used depending upon the particular configuration. A multiphase switch control module 303 receives a clock signal NCLK, receives voltages VC1X for each first intermediate node within each of the phases 1-N, receives voltages VC2X for each second intermediate node within each of the phases 1-N, provides control signals S1C1/S2C1 to Phase 1 305, provides control signals S1C2/S2C2 to Phase 2 307, and so on up to providing control signals S1CN/S2CN to the last phase network Phase N 309. Although not specifically shown, the control signals S1C1/S2C1 control the switches of the pair of switch capacitance networks within phase 1 305, the control signals S1C2/S2C2 control the switches of the pair of switch capacitance networks within phase 2 307, and so on up to the control signals S1CN/S2CN, which control the switches of the pair of switch capacitance networks within phase N 309. The name "NCLK" denotes that the frequency of NCLK is N times the frequency of a clock signal for a single phase. The suffix "X" for each voltage of the intermediate nodes denotes an index from 1-N. Each phase network is thus operated at 1/Nth the frequency of NCLK. For example, if each phase network 1-N is configured for a clock frequency of 10 MHz, then NCLK has a frequency of N×10 MHz (e.g., for 3 phases NCLK=3×10 MHz–30 MHz).

In one embodiment, the multiphase switch control module 303 may be configured to rotate operation of the phases in round-robin manner for multiphase operation. Thus, a first pulse of NCLK causes the multiphase switch control module 303 to control S1C1/S2C1 for Phase 1 305, the next pulse of NCLK causes the multiphase switch control module 303 to control S1C2/S2C2 for the second phase network Phase 2 307, and so on up to controlling S1CN/S2CN the last or Nth phase network 309. Operation then loops back to the first phase network and operation repeats in round-robin fashion for multiphase operation. In one embodiment, the multiphase switch control module 303 incorporates a ring counter or the like (not shown). Alternative operating schemes are contemplated, such as sequential or non-sequential phase operation, simultaneous phase operation, etc.

Figure 4:
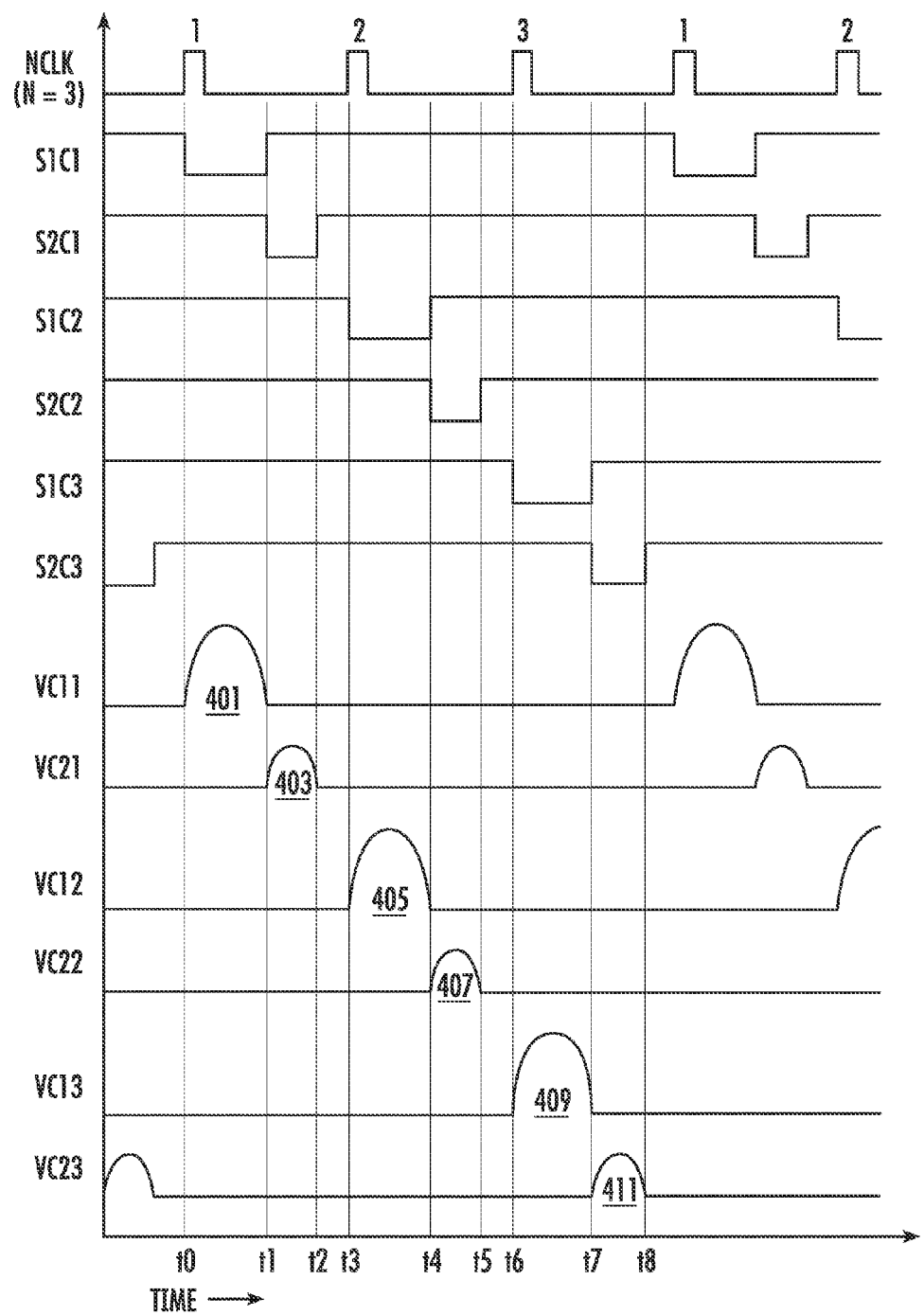
FIG. 4 is a timing diagram illustrating operation of the multiphase DC-DC converter of FIG. 3 according to one embodiment in which N=3 for 3 phases.

FIG. 4 is a timing diagram illustrating operation of the multiphase DC-DC converter 300 according to one embodiment in which N=3 for 3 phases. The NCLK signal is plotted versus time along with the switch control signals S1C1 and S2C1 for phase 1, S1C2 and S2C2 for phase 2, and S1C3 and S2C3 for phase 3. NCLK is the primary clock signal providing pulses at N times the rate of each single phase network as previously described. The clock pulses are consecutively numbered 1-3 to indicate the operative phase. Also plotted are the corresponding front and back-end sinusoidal pulses for the first and second intermediate node voltages VC1X and VC2X for each of the phases 1-N. Thus, the first phase 1 includes intermediate node voltages VC11 and VC21, the second phase 2 includes intermediate node voltages VC12 and VC22, and the third phase 3 includes intermediate node voltages VC13 and VC23.

Just before an initial time t0, S1CX and S2CX for each of the phase networks are high so that both of the front-end and back-end switch capacitance networks of each phase network are on. At time t0, an NCLK pulse occurs so that S1C1 goes low initiating a positive-going sinusoidal pulse 401 on VC11 at the front-end of the first phase network. At subsequent time t1, the sinusoidal pulse 401 at the front-end of the first phase network returns to zero causing the multiphase switch control module 303 to pull S1C1 high to turn the first switch back on completing the first front-end pulse 401. Also at time t1, S2C1 is pulled low to turn off the second switch within the first phase network which initiates a positive-going sinusoidal pulse 403 on VC21 at the back-end of the first phase network. At subsequent time t2, the sinusoidal pulse 403 at the back-end of the first phase network returns to zero causing the multiphase switch control module 303 to pull S2C1 high to turn off the second switch within the first phase network to complete the back-end pulse 403. At this time, the front-end and back-end sinusoidal pulses 401 and 403 for the first phase have completed and both internal switches are turned back on until the next NCLK pulse for phase 1.

The operation is repeated for phase 2 beginning at time t3 using the control signals S1C2 and S2C2 as shown. The control signals S1C2 and S2C2 are toggled resulting in a front-end sinusoidal pulse 405 between times t3 and t4 and a back-end sinusoidal pulse 407 between times t4 and t5. Just after time t5, the front-end and back-end sinusoidal pulses 405 and 407 for the second phase have completed and both internal switches are turned back on until the next NCLK pulse for phase 2. The operation is repeated for phase 3 beginning at time t6 using the control signals S1C3 and S2C3 as shown. The control signals S1C3 and S2C3 are toggled in similar manner resulting in a front-end sinusoidal pulse 409 between times t6 and t7 and a back-end sinusoidal pulse 411 between times t7 and t8. Just after time t8, the front-end and back-end sinusoidal pulses 409 and 411 for the third phase have completed and both internal switches are turned back on until the next NCLK pulse for phase 3. Operation then returns to the first phase 1 beginning with the next NCLK pulse and operation repeats for each of the phases. Operation may be adjusted according to a desired regulation scheme, such as variable frequency control, phase shift control, PWM control, etc.

Figure 5:
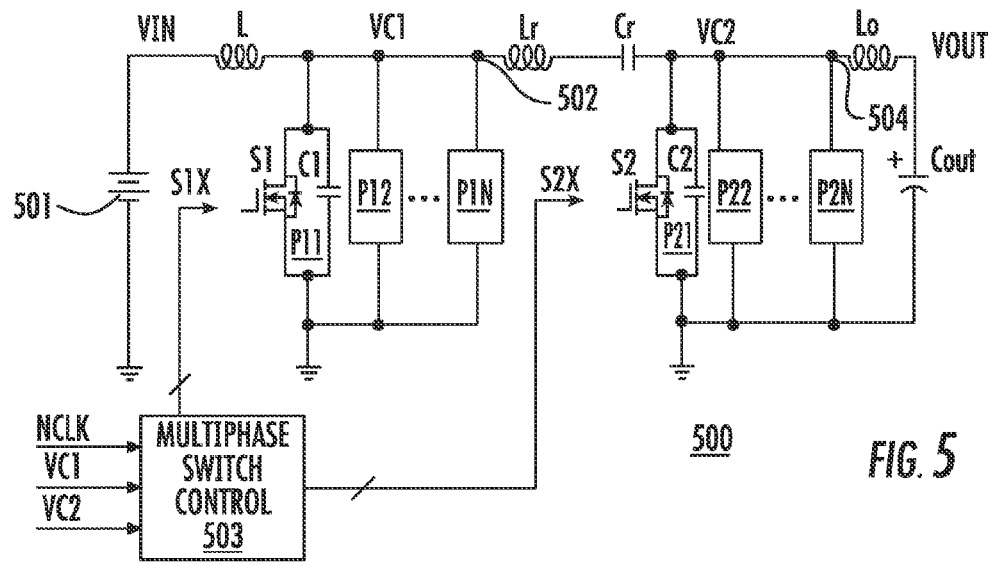
FIG. 5 is a block and schematic diagram of a multiphase DC-DC converter according to another embodiment including and single conversion path with multiple first switch capacitance networks coupled in parallel to the first intermediate node and multiple second switch capacitance networks coupled in parallel to the second intermediate node.

FIG. 5 is a block and schematic diagram of a multiphase DC-DC converter 500 according to another embodiment. An input voltage source 501 develops an input voltage VIN relative to ground. VIN is provided to one end of an inductor L, having its other end coupled to a first intermediate node 502 developing a voltage VC1. An electronic switch S1 and capacitor C1 are coupled in parallel between node 502 and ground forming a switch capacitance network P11 in substantially the same manner as the switch capacitance network P1 of converter 100 previously described. A similar second switch capacitance network P12 is also included and coupled between node 502 and ground. Any number N of switch capacitance networks may be included up to an Nth switch capacitance network P1N, each coupled between node 502 and ground. The switch capacitance networks P12-P1N each include an electronic switch and capacitor in substantially the same manner as the switch capacitance network P11.

Node 502 is coupled to one end of another inductor Lr, having its other end coupled to one end of a capacitor Cr. The other end of the capacitor Cr is coupled to a second intermediate node 504 developing a voltage VC2. Another electronic switch S2 and capacitor C2 are coupled in parallel between node 504 and ground forming a switch capacitance network P21 in substantially the same manner as the switch capacitance network P11. Additional switch capacitance networks P22-P2N are included and coupled between node 504 and ground. Again, the switch capacitance networks P22-P2N each include an electronic switch and capacitor in substantially the same manner as the switch capacitance network P21. The other end of Lo is coupled to an output node developing an output voltage VOUT, which is coupled to one end of an output capacitor Cout. The other end of Cout is coupled to ground. A multiphase switch control module 503 receives a clock signal NCLK, the voltages VC1 and VC2 of the intermediate nodes 502 and 504, and provides a first set of control signals S1X to the gates of the switches of the switch capacitance networks P11-P1N, and provides a second set of control signals S2X to the gates of the switches of the switch capacitance networks P21-P2N.

The converter 500 is similar to the converter 100 in that it includes a single conversion path between VIN and VOUT including inductances L, Lr and Lo, the capacitance Cr and intermediate nodes 502 and 504 developing voltages VC1 and VC2. The converter 500, however, includes multiple switch capacitance networks P11-P1N coupled between the first intermediate node 502 and ground, and another multiple switch capacitance networks P21-P2N coupled between the second intermediate node 504 and ground. The multiphase switch control module 503 provides the control signals S1X to control the switch capacitance networks P11-P1N and provides the control signals S2X to control the switch capacitance networks P21-P2N to control DC-DC voltage conversion from VIN to VOUT.

Figure 6:
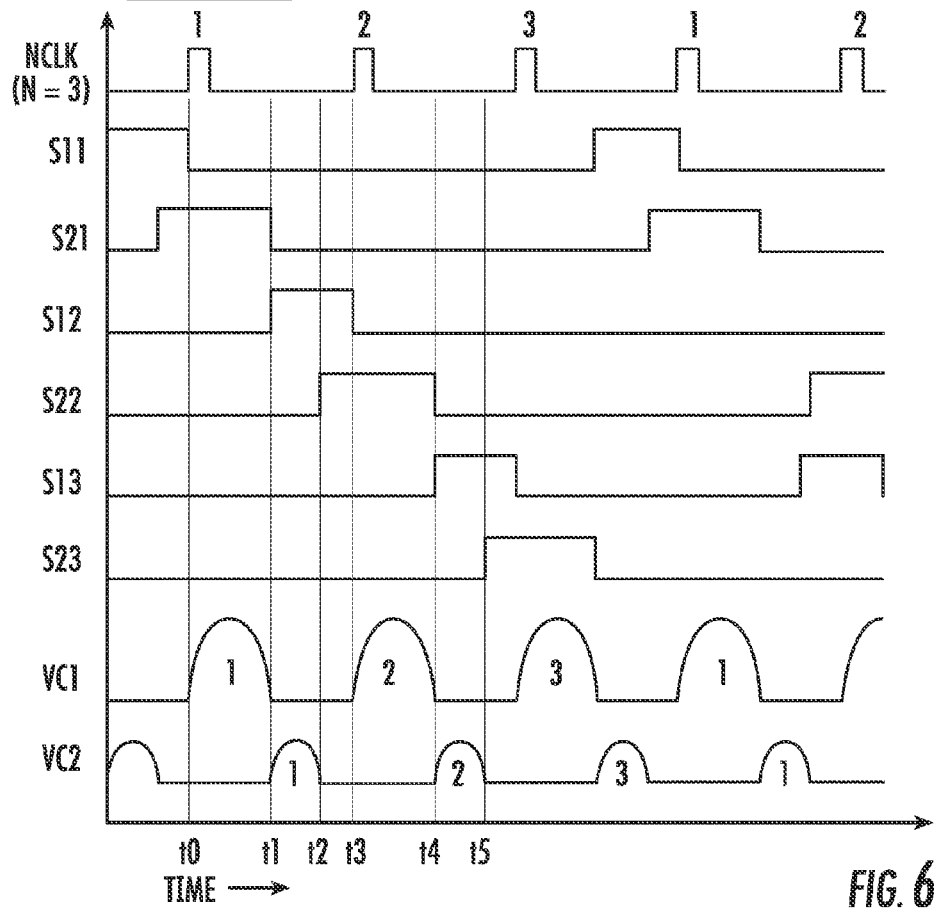
FIG. 6 is a timing diagram illustrating operation of the multiphase converter of FIG. 5 according to one embodiment for N=3 phases.

FIG. 6 is a timing diagram illustrating operation of the multiphase converter 500 according to one embodiment for N=3 phases, where the switch capacitance network P13 replaces P1N and the switch capacitance network P23 replaces P2N. In FIG. 6, the control signals S11-S13 and S21-S23 are plotted versus time in which each control signal controls a corresponding one of the switch capacitance networks P11-P13 and P21-P23, respectively. The voltages VC1 and VC2 are also plotted below the control signals. Operation of the multiphase converter 500 is somewhat similar to the single phase converter 100 except that the multiphase switch control module 503 controls the switch capacitance networks P11-P13 and P21-P23 according to multiphase operation. In one embodiment, for example, operation may be rotated between switch pairs (e.g., P11 and P21, P12 and P22, and P13 and P23) in round-robin fashion. Switching and the corresponding sinusoidal pulses are similar to that shown in FIG. 4 in which each phase completes between NCLK cycles. Given the parallel configuration of the multiphase converter 500, however, each of the switch capacitance networks P11-P13 of the front-end is off for each pulse of NCLK in order to initiate a front-end sinusoidal pulse, and each of the switch capacitance networks P21-P23 of the back-end is off to initiate a back-end sinusoidal pulse.

At time t0, a first pulse occurs on NCLK. S11, which was high from a prior cycle, goes low at time t0 to turn off P11 to initiate a first front-end sinusoidal pulse on VC1. S21 is high at time t so that P21 is on from a prior cycle. At subsequent time t1, the first front-end sinusoidal pulse completes so that VC1 returns back to zero. In this case, rather than S11 going back high at time t1, operation is rotated so that S12 of the next phase is pulled high to turn on P12 to complete the first front-end pulse. Also, S21 goes low at time t1 to turn P21 off, and since P22 and P23 are also off, a first back-end sinusoidal pulse on VC2 is initiated at time t1. When the first back-end sinusoidal pulse on VC2 returns to zero at subsequent time t2, rather than turning P21 back on, operation is rotated so that S22 is pulled high to turn on P22 to complete the first back-end pulse for the first CLK cycle. At the second NCLK pulse at time t3, S12 is pulled low to turn off P12 to initiate the second front-end sinusoidal pulse on VC1. At time t4, the second front-end sinusoidal pulse on VC1 returns back to zero, and S13 is pulled high to turn on P13 to complete the second front-end pulse. Also at time t4, S22 is pulled low to turn off P22 to initiate the second back-end pulse on VC2. When the second back-end sinusoidal pulse returns to zero at time t5, S23 is pulled high to turn on P23 to complete the second back-end pulse. Operation is repeated in this manner to rotate among the multiple phases for multiphase operation resulting in front end and back end sinusoidal pulses on VC1 and VC2 as shown. Alternative operating schemes are contemplated, such as sequential or non-sequential phase operation, simultaneous phase operation, etc. Also, operation may be adjusted according to a desired regulation scheme, such as variable frequency control, phase shift control, PWM control, etc.

The multiphase DC-DC converter 500 provides a benefit of reducing the size of the front-end inductor L since it is operated at N times the frequency of a single phase. One issue with the multiphase DC-DC converter 500 is that each switch within the switch capacitance networks sees most or all of the operating current so that larger switches are used.

Figure 7:
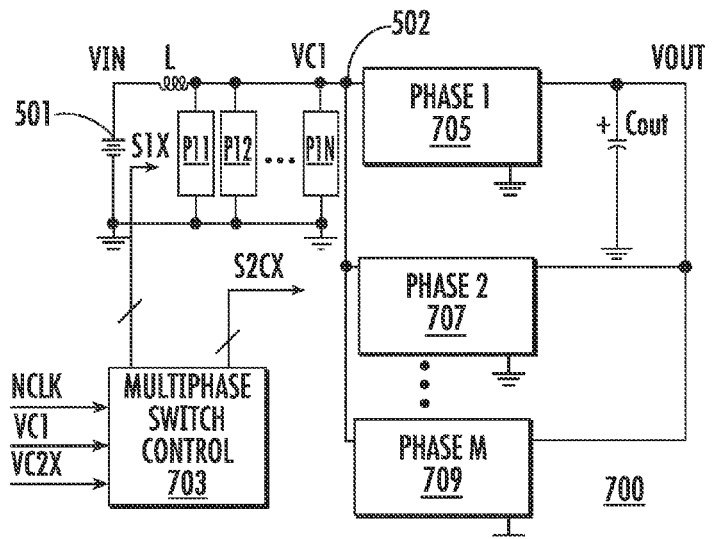
FIG. 7 is block and schematic diagram of a multiphase DC-DC converter according to another embodiment including a common front end conversion path similar to that shown in FIG. 5 and multiple back-end conversion paths similar to the back-end portions of FIG. 3.

FIG. 7 is block and schematic diagram of a multiphase DC-DC converter 700 according to another embodiment. The front-end of the multiphase DC-DC converter 700 is substantially similar to that of the multiphase converter 500 including the voltage source 501 providing VIN to input inductor L and the N switch capacitance networks P11-P1N coupled between an intermediate node 502 and ground, in which node 502 develops voltage VC1. The back-end of the multiphase DC-DC converter 700, however, includes M phase networks 705, 707, ..., 709 coupled in parallel in a similar manner as the multiphase DC-DC converter 300 shown in FIG. 3. N and M are both integers greater than zero which may be the same or which may be different. Each of the phase networks 705-709 are configured in substantially the same manner as the back-end network 107 of the single phase DC-DC converter 100, except having a common input node 502 for receiving VC1 and a common output capacitor Cout which is common to all phases developing the output voltage VOUT relative to ground. The multiphase DC-DC converter 700 includes a multiphase switch control module 703 which receives NCLK and VC1 and provides the control signals S1X to the front-end switch capacitance networks P11-P1N in a similar manner as the multiphase switch control module 503 for the multiphase DC-DC converter 500. Further, the multiphase switch control module 703 receives VC2X (from corresponding intermediate nodes of the phase networks 1-M) and provides the S2CX control signals to the back-end phase networks 705-709 in a similar manner as the back-end control signals for the multiphase DC-DC converter 300.

Figure 8:
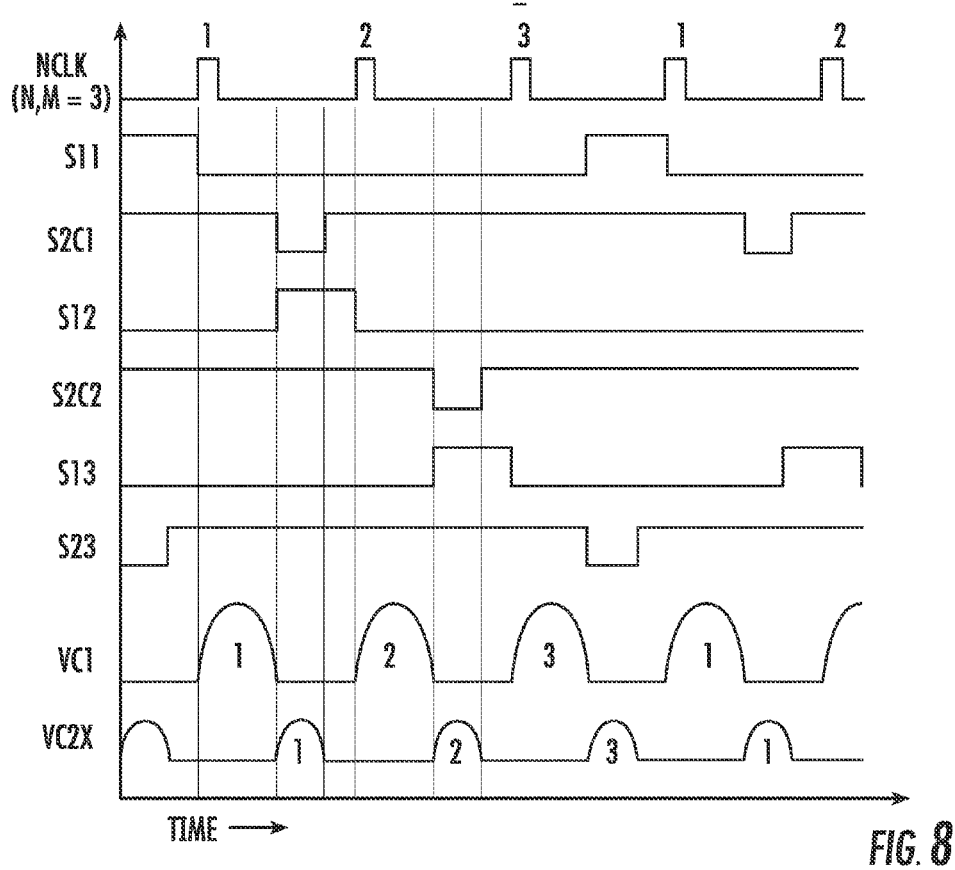
FIG. 8 is a timing diagram illustrating operation of the multiphase DC-DC converter of FIG. 7 according to one embodiment for M=N=3 phases.

FIG. 8 is a timing diagram illustrating operation of the multiphase DC-DC converter 700 according to one embodiment for M=N=3 phases. Operation of the front-end of the multiphase converter 700 is substantially similar to that of the front end of the multiphase DC-DC converter 500 and operation of the back-end is substantially similar to that of the back end of the multiphase DC-DC converter 300. As shown, the control signals S11, S12 and S13 for the front end are plotted along with NCLK versus time in substantially the same manner as shown in FIG. 6 for generating the front-end pulses on VC1 on node 502. Also, the control signals S2C1, S2C2 and S2C3 for the back-end network are plotted in substantially the same manner as shown in FIG. 3 for generating the back-end pulses on the second intermediate nodes VC2X within the respective phase networks. The back-end pulses are shown plotted on a collective signal "VC2X", where it is understood that each back-end pulse occurs within a corresponding one of the phase networks 1-M of the converter 700. The back-end pulses rotate among the back-end networks in a similar manner as shown in FIG. 4 for the converter 300. The front-end network operates at N times the single phase frequency whereas each phase network of the back end operates at the single phase frequency. Operation is rotated among the multiple phase networks in substantially the same manner previously described. Alternative operating schemes are contemplated, such as sequential or non-sequential phase operation, simultaneous phase operation, etc. Also, operation may be adjusted according to a desired regulation scheme, such as variable frequency control, phase shift control, PWM control, etc.

The multiphase converter 700 provides the benefit that the input or front-end inductor L may be reduced in size since operating at N times the frequency of the single phase. Although the switches of the front end switch capacitance networks are larger for greater current capacity, the switches of the individual phase networks 705-709 may be reduced in size since the phases generally share the load current among the multiple phases. In one embodiment, the number N of phases of the front-end may be different from the number M of phases at the back-end, as long as the overall frequency of both are the same. For example, the number of phases of the front-end may be reduced and may even have a single phase (e.g., N=1). The front-end may have 2 (N=2) phases and the back-end may have 4 phases (M=4) in which each front-end phase operates at ½ the overall frequency whereas each back-end phase operates at ¼ the overall frequency. The front-end may have 2 phases and the back-end may have 6 (M=6) phases in which each front-end phase operates at ½ the overall frequency whereas each back-end phase operates at ⅓ the overall frequency. The front-end may have 3 phases (N=3) and the back-end may have 6 phases (M=6) in which each front-end phase operates at ½ the overall frequency whereas each back-end phase operates at ⅙ the overall frequency. Many other such combinations of an and M are contemplated.

Figure 9:
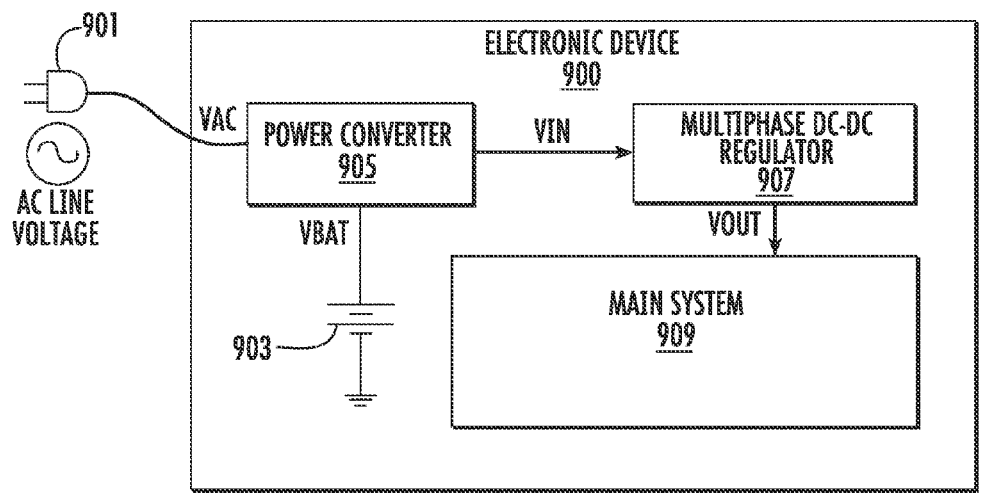
FIG. 9 is a simplified block diagram of an electronic device including a multiphase DC-DC regulator implemented according to one embodiment which may incorporate any of the multiphase DC-DC converter embodiments described herein, among others.

FIG. 9 is a simplified block diagram of an electronic device 900 including a multiphase DC-DC regulator 907 implemented according to one embodiment. The multiphase DC-DC regulator 907 may incorporate any one of the converter embodiments described herein, such as any of the multiphase DC-DC converters 300, 500, 700 or variations thereof, and further includes a regulator according to any regulation scheme as further described herein. The electronic device 900 may receive power from any one of multiple sources, such as, for example, from an alternating current (AC) plug 901 providing an AC line voltage VAC, or a battery 903 providing a battery voltage VBAT, or from other power sources. The AC plug 901 if provided, is configured to plug into an AC outlet for receiving AC line voltage and for providing the AC line voltage to an input of the electronic device 900. The battery 903, if provided, may be integrated or replaceable and may be rechargeable. One or both of VAC and VBAT are provided to a power converter 905 which provides an unregulated DC voltage VIN to the multiphase DC-DC converter 907. Thus, the power converter 905 implements any of the input voltage sources 101, 301, or 501 or the like. In one embodiment, VIN is unregulated in that it may have a voltage level dependent upon the magnitude or type of VAC, or a voltage level that depends upon VBAT, which may vary depending upon the level of charge of the battery 903. The multiphase DC-DC regulator 907 converts VIN to a regulated output DC voltage VOUT, which is provided to a main system 909 within the electronic device 900.

The main system 909 is configured according to the particular type of electronic device 900, and includes any combination of devices, circuits, components, software, firmware, systems, etc., configured for implementing the functions of the electronic device 900. The electronic device 900 is one of any type of consumer, commercial, or industrial devices or products, such as, for example, appliances (e.g., refrigerators, microwaves, dishwashers, washers, dryers, ovens coffee makers, etc.), computer and office automation systems (e.g., desktops, monitors, notebooks, external disk drives, printers, facsimile machines, etc.), audio/video (A/V) products (e.g., televisions, stereo systems, iPod docking stations, media players, etc.), communication devices (e.g., set-top boxes, cable modems, wired/wireless access/communication devices, etc.), industrial control systems, medical devices and machines, etc. This list of products is not intended to be exhaustive such that any type of consumer, commercial or industrial electronic device is contemplated. The electronic system incorporated within the electronic device 900 includes the appropriate electronic devices and/or subsystems, components, circuits, etc., such as any combination of any one or more of memory devices, controllers, microprocessors, coprocessor, etc.

The multiphase DC-DC regulator 907 is particularly suited for low drop-out (LDO) replacement applications such as, for example, medical instruments or space-constrained devices such as cellular phones and the like. The soft-switching characteristics of the multiphase DC-DC regulator 907 (including a converter implemented according to any of the embodiments described herein) exhibit less conducted and radiated noise for reduced electromagnetic interference (EM) emissions and/or low output ripple on VOUT. The multiphase DC-DC regulator 907 may be operated at relatively high frequencies for voltage converters (e.g., megahertz range such as 1, 10, 50, etc., MHz switching frequency) which significantly reduces the output ripple of VOUT to a relatively low level.

Figure 10:
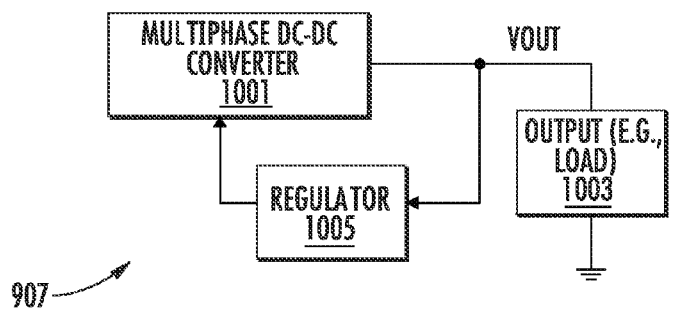
FIG. 10 is a simplified block diagram of the multiphase DC-DC regulator according to one embodiment including a regulator network for regulating the output voltage.

FIG. 10 is a simplified block diagram of the multiphase DC-DC regulator 907 according to one embodiment. The multiphase DC-DC regulator 907 includes a multiphase DC-DC converter 1001, which is implemented based on any of the multiphase DC-DC converters 300, 500, 700 or variations thereof as previously described. VOUT is provided to an output network 1003, which may include one or more load devices and which may include other circuit components, such as including the output capacitor Cout and/or other output devices. VOUT is provided to a regulator network 1005, which is further provided to at least one input of the multiphase DC-DC converter 1001. The regulator network 1005 senses VOUT (and may further sense other output parameters, e.g., output current) and controls the multiphase DC-DC converter 1001 for purposes or regulating VOUT. The regulator network 1005 may be further configured to regulate or otherwise control other output parameters, such as output current or the like. The regulator network 1005 controls a multiphase switch control module within the multiphase DC-DC converter 1001, such as configured according to any of the control modules 303, 503, 703 previously described.

Figure 11:
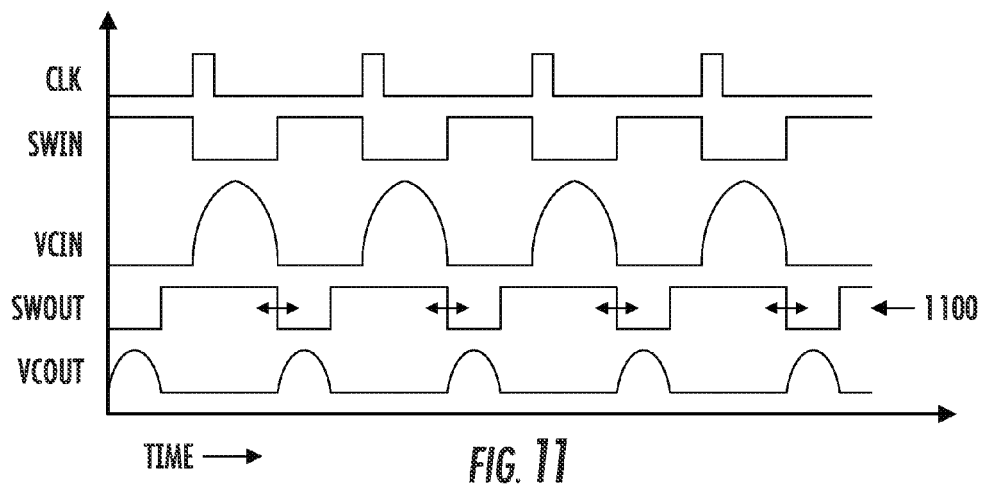
FIGS. 11, 12 and 13 are timing diagrams illustrating operation of the regulator network of FIG. 10 according to phase shift control, variable frequency control, and PWM control, respectively, for regulating the output voltage.
Figure 12:
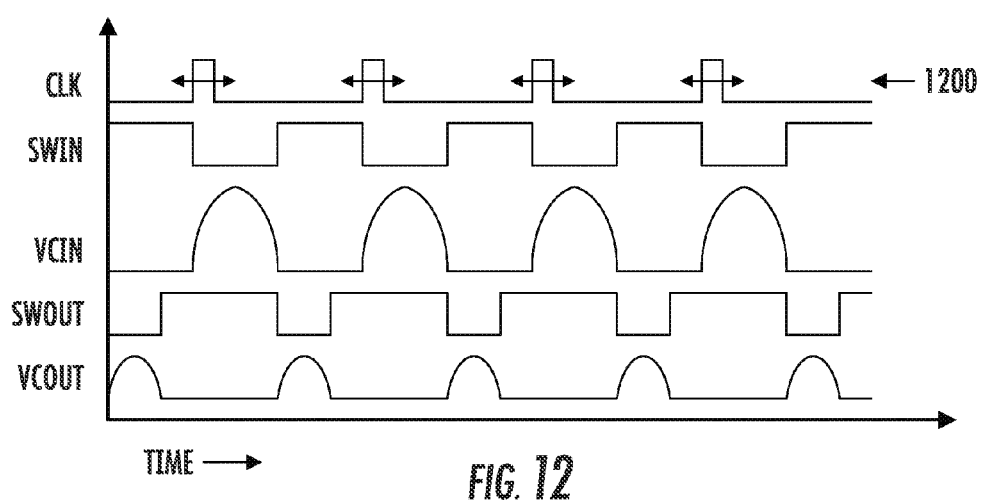
Figure 13:
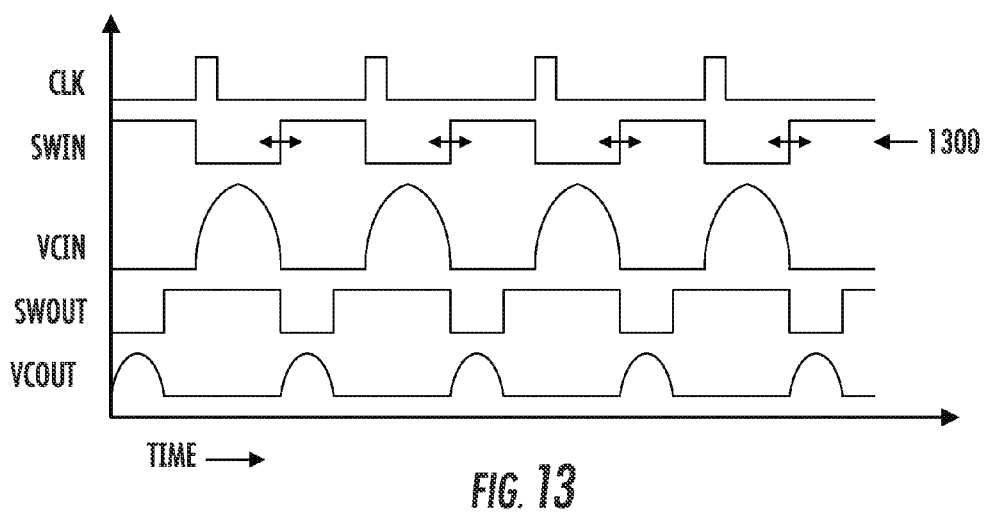

FIGS. 11, 12 and 13 are timing diagrams illustrating operation of the regulator network 1005 according to phase shift control, variable frequency control, and PWM control, respectively, for regulating VOUT. The timing diagrams are generalized and represent operation according to any one of the multiphase schemes previously described. In each case, a clock signal CLK is plotted along with SWIN, VCIN, SWOUT and VCOUT versus time. The CLK signal represents one or more clock signals (e.g., CLK or NCLK or the like). SWIN represents the switching function of the one or more switches of the front-end network (e.g., 105 for each of the phases of 300, or the switch capacitance networks P11-P1N at the front-end of 500 or 700). SWOUT represents the switching function of the one or more switches of the back-end network (e.g., 107 for each of the phases of 300, or the switch capacitance networks P21-P2N at the back-end of each of the one or more phases of 500 or 700). VCIN represents each voltage of the one or more front-end intermediate nodes (e.g., 102 of each phase of 300, or 502 of 500 or 700). VCOUT represents each voltage of the one or more back-end intermediate nodes (e.g., 104 of each phase of 300 or 700, or 504 of 500).

As shown in FIG. 11, a series of arrows 1100 are shown at each falling edge of SWOUT for each cycle to illustrate phase shift control. For maximum energy transfer, SWOUT turns off (goes low) as soon as VCIN falls to zero in a similar manner as previously described. For phase shift control, the arrows 1100 at each falling edge of SWOUT represent controlling the timing delay of turning off the back-end portion switching (as represented by SWOUT) of the multiphase DC-DC converter 1001 to control the amount of energy transferred to the output. The controlled timing delay of SWOUT implements phase shift control for controlling or otherwise regulating an output parameter, such as VOUT.

As shown in FIG. 12, a series of arrows 1200 are shown for each pulse of CLK to illustrate variable frequency control. For increased energy transfer, the frequency of CLK is reduced and for decreased energy transfer, the frequency of CLK is increased. Thus, the arrows 1200 represent variable frequency of CLK. The controlled frequency of CLK implements variable frequency control for controlling or otherwise regulating an output parameter, such as VOUT.

As shown in FIG. 13, a series of arrows 1300 are shown at each rising edge of SWIN for each cycle to illustrate PWM control. For maximum energy transfer, SWIN turns on (goes high) as soon as VCIN falls to zero in a similar manner as previously described. For PWM control, the arrows 1300 at each rising edge of SWIN represent controlling the timing delay of turning on the front-end portion switching (as represented by SWIN) of the multiphase DC-DC converter 1001 to control the amount of energy transferred to the output. The controlled timing delay of SWIN implements PWM control for controlling or otherwise regulating an output parameter, such as VOUT.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A multiphase DC-DC converter for converting an input DC voltage to an output DC voltage, comprising:
   an input node for receiving the input DC voltage and an output node for providing the output DC voltage, each relative to a reference voltage on a reference node;
   at least one conversion path coupled between said input and output nodes, each said conversion path comprising:

at least one input inductance provided between said input node and a corresponding one of at least one first intermediate node;

at least one intermediate inductance and corresponding capacitance coupled in series between a corresponding first intermediate node and a corresponding one of at least one second intermediate node; and at least one output inductance coupled between said output node and a corresponding second intermediate node;

at least one first switch capacitance network, each comprising an electronic switch coupled in parallel with a capacitance, and each coupled between a corresponding first intermediate node and said reference node;

a plurality of second switch capacitance networks, each comprising an electronic switch coupled in parallel with a capacitance, and each coupled between a corresponding second intermediate node and said reference node; and a multiphase switch controller which controls each of said at least one first switch capacitance network and said plurality of second capacitance networks based on zero voltage switching relative to voltages of said at least one first intermediate node and said at least one second intermediate node.

2. The multiphase DC-DC converter of claim 1, wherein:

said at least one conversion path comprises a plurality of conversion paths;

wherein said at least one first switch capacitance network comprises a plurality of first switch capacitance networks;

wherein each of said plurality of conversion paths comprises:

a corresponding one of a plurality of first intermediate nodes coupled to a corresponding one of said plurality of first switch capacitance networks;

a corresponding one of a plurality of second intermediate nodes coupled to a corresponding one of said plurality of second switch capacitance networks; and wherein said plurality of first switch capacitance networks and said plurality of second switch capacitance networks collectively comprise a plurality of switch capacitance network pairs, each including a first switch capacitance network coupled to a first intermediate node of a corresponding conversion path and a second switch capacitance network coupled to a second intermediate node of said corresponding conversion path; and wherein for each of said plurality of switch capacitance network pairs, said multiphase switch controller turns off a switch of one corresponding first switch capacitance network in response to a pulse of a clock signal, turns said switch of said one corresponding first switch capacitance network back on and turns off a switch of one corresponding second switch capacitance network when a corresponding first intermediate node returns back approximately to said reference voltage, and turns said switch of said one corresponding second switch capacitance network back on when a corresponding second intermediate node returns back approximately to said reference voltage.

3. The multiphase DC-DC converter of claim 1, wherein:

said at least one conversion path comprises a single conversion path including a first intermediate node and a second intermediate node;

wherein said at least one first switch capacitance network comprises a plurality of first switch capacitance networks which are coupled in parallel to said first intermediate node;

wherein said plurality of second switch capacitance networks are coupled in parallel to said second intermediate node; and wherein said multiphase switch controller turns off a switch of any of said plurality of first switch capacitance networks that is on upon each pulse of a clock signal, turns on a switch of one of said plurality of first switch capacitance networks when said first intermediate node returns to approximately zero, turns off a switch of any of said plurality of second switch capacitance networks that is on when said first intermediate node returns to approximately zero, and turns on a switch of one of said plurality of second switch capacitance networks when said second intermediate node returns to approximately zero.

4. The multiphase DC-DC converter of claim 1, wherein:

said at least one conversion path comprises:

an input inductance coupled between said input node and a common first intermediate node;

a plurality of intermediate inductances and corresponding capacitances, each coupled in series between said common first intermediate node and a corresponding one of a plurality of second intermediate nodes; and a plurality of output inductances, each coupled between said output node and a corresponding one of said plurality of second intermediate nodes;

wherein said at least one first switch capacitance network is coupled to said common first intermediate node;

wherein each of said plurality of second switch capacitance networks is coupled to a corresponding one of said plurality of second intermediate nodes; and wherein said multiphase switch controller turns off a switch of any of said at least one first switch capacitance network that is on upon each pulse of a clock signal, turns on a switch of one of said at least one first switch capacitance network when said common first intermediate node returns to approximately zero, turns off a switch of one of said plurality of second switch capacitance networks when said common first intermediate node returns to approximately zero, and turns on a switch of said one of said plurality of second switch capacitance networks when a corresponding second intermediate node returns to approximately zero.

5. The multiphase DC-DC converter of claim 4, wherein said at least one first switch capacitance network comprises a first number of first switch capacitance networks, wherein said plurality of second switch capacitance networks comprises a second number of first switch capacitance networks, and wherein said first and second numbers are different.

6. The multiphase DC-DC converter of claim 1, further comprising a regulator network coupled to said multiphase switch controller for regulating the output DC voltage.

7. The multiphase DC-DC converter of claim 6, wherein said regulator operates according to phase shift control.

8. An electronic device, comprising:

a power converter which provides an input DC voltage;

a multiphase DC-DC converter which converts said input DC voltage to an output DC voltage;

a main system which operates using said output DC voltage; and wherein said multiphase DC-DC converter comprises:
  at least one conversion path coupled between said input and output DC voltages, each said conversion path comprising:
    at least one input inductance provided between said input node and a corresponding one of at least one first intermediate node;
    at least one intermediate inductance and corresponding capacitance coupled in series between a corresponding first intermediate node and a corresponding one of at least one second intermediate node; and
    at least one output inductance coupled between said output node and a corresponding second intermediate node;
  at least one first switch capacitance network, each comprising an electronic switch coupled in parallel with a capacitance, and each coupled between a corresponding first intermediate node and said reference node;
  a plurality of second switch capacitance networks, each comprising an electronic switch coupled in parallel with a capacitance, and each coupled between a corresponding second intermediate node and said reference node; and
  a multiphase switch controller which controls each of said at least one first switch capacitance network and said plurality of second capacitance networks using zero voltage switching based on voltages of said at least one first intermediate node and said at least one second intermediate node.

9. The electronic device of claim 8, wherein:
said at least one first switch capacitance network comprises a plurality of first switch capacitance networks;
wherein said at least one conversion path comprises a plurality of conversion paths, each comprising:
  a corresponding one of a plurality of first intermediate nodes coupled to a corresponding one of said plurality of first switch capacitance networks;
  a corresponding one of a plurality of second intermediate nodes coupled to a corresponding one of said plurality of second switch capacitance networks; and
  wherein said plurality of first switch capacitance networks and said plurality of second switch capacitance networks collectively comprise a plurality of switch capacitance network pairs, each including a first switch capacitance network coupled to a first intermediate node of a corresponding conversion path and a second switch capacitance network coupled to a second intermediate node of said corresponding conversion path; and
wherein said multiphase switch controller sequentially switches each of said plurality of switch capacitance network pairs based on a clock signal, wherein for each of said plurality of switch capacitance network pairs, said multiphase switch controller turns off a switch of one corresponding first switch capacitance network in response to a pulse of said clock signal, turns said switch of said corresponding one first switch capacitance network back on and turns off a switch of one corresponding second switch capacitance network when a corresponding first intermediate node returns back approximately to said reference voltage, and turns said switch of said one corresponding second switch capacitance network back on when a corresponding second intermediate node returns back approximately to said reference voltage.

10. The electronic device of claim 8, wherein:
said at least one conversion path comprises a single conversion path including a first intermediate node and a second intermediate node;
wherein said at least one first switch capacitance network comprises a plurality of first switch capacitance networks which are coupled in parallel to said first intermediate node;
wherein said plurality of second switch capacitance networks are coupled in parallel to said second intermediate node; and
wherein said multiphase switch controller sequentially operates each of said plurality of first and second switch capacitance networks based on a clock signal, wherein said multiphase switch controller turns off a switch of any of said plurality of first switch capacitance networks that is on upon each pulse of said clock signal, turns on said switch of one of said plurality of first switch capacitance networks when said first intermediate node returns to approximately zero, turns off said switch of any of said plurality of second switch capacitance networks that is on when said first intermediate node returns to approximately zero, and turns said switch of on one of said plurality of second switch capacitance networks when said second intermediate node returns to approximately zero.

11. The electronic device of claim 8, wherein:
said at least one conversion path comprises:
  an input inductance coupled between said input node and a common first intermediate node;
  a plurality of intermediate inductances and corresponding capacitances, each coupled in series between said common first intermediate node and a corresponding one of a plurality of second intermediate nodes; and
  a plurality of output inductances, each coupled between said output node and a corresponding one of said plurality of second intermediate nodes;
wherein said at least one first switch capacitance network is coupled to said common first intermediate node;
wherein each of said plurality of second switch capacitance networks is coupled to a corresponding one of said plurality of second intermediate nodes; and
wherein said multiphase switch controller sequentially operates each of said at least one first switch capacitance network and each of said plurality of second switch capacitance networks based on a clock signal, wherein said multiphase switch controller turns off said switch of any of said at least one first switch capacitance network that is on upon each pulse of said clock signal, turns on said switch of one of said at least one first switch capacitance network when said common first intermediate node returns to approximately zero, turns off said switch of one of said plurality of second switch capacitance networks when said common first intermediate node returns to approximately zero, and turns on said switch of said one of said plurality of second switch capacitance networks when a corresponding second intermediate node returns to approximately zero.

12. The electronic device of claim 11, wherein said at least one first switch capacitance network comprises a first number of first switch capacitance networks, wherein said plurality of second switch capacitance networks comprises a second number of first switch capacitance networks, and wherein said first and second numbers are different.

13. The electronic device of claim 10, further comprising a regulator network coupled to said DC-DC converter which regulates said output DC voltage.

14. The electronic device of claim 13, wherein said regulator network operates according to one of phase shift control, variable frequency control, and pulse-width modulation control.

15. A method of converting an input DC voltage received at an input node to an output DC voltage provided on an output node relative to a reference voltage on a reference node, comprising:

providing at least one conversion path between the input and output nodes, comprising coupling at least one input inductance between the input node and a corresponding one of at least one first intermediate node, coupling at least one intermediate inductance and corresponding capacitance in series between a corresponding first intermediate node and a corresponding one of at least one second intermediate node, and coupling at least one output inductance between a corresponding second intermediate node and the output node;

coupling at least one first capacitance between a corresponding first intermediate node and the reference node and coupling each of a plurality of second capacitances between a corresponding second intermediate node and the reference node;

coupling each of a plurality of electronic switches in parallel with a corresponding one of each of the at least one first capacitance and each of the plurality of second capacitances; and selectively activating the plurality of switches based on zero voltage switching relative to voltages of the at least one first intermediate node and the at least one second intermediate node.

16. The method of claim 15, wherein:

said providing at least one conversion path comprises providing a plurality of conversion paths including providing a plurality of first intermediate nodes and a plurality of second intermediate nodes;

wherein said coupling the first and second capacitances comprises coupling a corresponding one of a plurality of first capacitances between a corresponding one of the plurality of first intermediate nodes and the reference node, and coupling a corresponding one of the plurality of second capacitances between a corresponding one of the plurality of second intermediate nodes and the reference node; and wherein said selectively activating comprises turning off a first switch in parallel with a first capacitance in response to a pulse of a clock signal, turning off the first switch and turning on a corresponding second switch when a corresponding first intermediate node returns back to approximately the reference voltage, and turning on the corresponding second switch when a corresponding second intermediate node returns back to approximately the reference voltage.

17. The method of claim 15, wherein:

said providing at least one conversion path comprises providing a single conversion path including a first intermediate node and a second intermediate node;

wherein said coupling the first and second capacitances comprises coupling a plurality of first capacitances between the first intermediate node and the reference node, and coupling the plurality of second capacitances between the second intermediate node and the reference node; and wherein said selectively activating comprises turning on a first switch coupled in parallel with any of the plurality of first capacitances that is turned off upon each pulse of a clock signal, turning off the first switch when the first intermediate node returns to approximately zero, turning on a second switch coupled in parallel with any of the plurality of second capacitances that is turned off when the first intermediate node returns to approximately zero, and turning off a second switch coupled in parallel with one of the plurality of second capacitances when the second intermediate node returns to approximately zero.

18. The method of claim 15, wherein:

said providing at least one conversion path comprises coupling an input inductance between the input node and a common first intermediate node, coupling each of a plurality of intermediate inductances and corresponding capacitances in series between the common first intermediate node and a corresponding one of a plurality of second intermediate nodes, and coupling each of a plurality of output inductances between the output node and a corresponding one of the plurality of second intermediate nodes;

wherein said coupling the first and second capacitances comprises coupling at least one first capacitance between the common first intermediate node and the reference node, and coupling a corresponding one of the plurality of second capacitances between a corresponding one of the plurality of second intermediate nodes and the reference node; and wherein said selectively activating comprises turning on a first switch coupled in parallel with any of the at least one first capacitance that is turned off upon each pulse of a clock signal, turning off the first switch when the common first intermediate node returns to approximately zero, turning on a second switch coupled in parallel with one of the plurality of second capacitances when the common first intermediate node returns to approximately zero, and turning off the second switch when a corresponding second intermediate node returns to approximately zero.

19. The method of claim 15, further comprising controlling said selectively activating the plurality of switches to regulate the output DC voltage.

20. The method of claim 19, wherein said controlling comprising controlling said selectively activating the plurality of switches to regulate the output DC voltage according to one of phase shift control, variable frequency control, and pulse-width modulation control.

* * * * *